(12) United States Patent
Babirecki et al.

(10) Patent No.: US 10,907,661 B2
(45) Date of Patent: Feb. 2, 2021

(54) DISTRIBUTOR BLOCK FOR AIR DISTRIBUTION IN PNEUMATIC SYSTEMS OF COMMERCIAL VEHICLES

(71) Applicant: MB-Pneumatyka Sp. z o.o., Sulechow (PL)

(72) Inventors: Wojciech Babirecki, Zielona Gora (PL); Malgorzata Bieniaszewska, Zielona Gora (PL)

(73) Assignee: MB-PNEUMATYKA SP. Z O.O., Sulechow (PL)

( * ) Notice: Subject to any disclaimer, the term of this patent is extended or adjusted under 35 U.S.C. 154(b) by 0 days.

(21) Appl. No.: 16/430,678

(22) Filed: Jun. 4, 2019

(65) Prior Publication Data

US 2020/0003235 A1    Jan. 2, 2020

(30) Foreign Application Priority Data

Jun. 28, 2018 (PL) .......................................... 426109

(51) Int. Cl.
  *F16L 37/14*    (2006.01)
  *F15B 13/02*    (2006.01)
  *B60R 16/08*    (2006.01)
  *B60G 11/27*    (2006.01)
  *B60T 17/00*    (2006.01)

(52) U.S. Cl.
  CPC ............ *F15B 13/02* (2013.01); *F16L 37/142* (2013.01); *B60G 11/27* (2013.01); *B60R 16/08* (2013.01); *B60T 17/00* (2013.01)

(58) Field of Classification Search
  CPC ........... B60G 17/0526; B60G 2500/203; F16L 37/142; F16L 37/144; F16L 41/03; B60R 16/08; B60T 17/043; B60T 17/046
  See application file for complete search history.

(56) References Cited

U.S. PATENT DOCUMENTS 3,934,605 A * 1/1976 Legris ..................... F16L 37/26
                                                                137/271
4,712,578 A   12/1987 White
(Continued)

FOREIGN PATENT DOCUMENTS

EP        2525127 A1    11/2012

OTHER PUBLICATIONS

Camozzi Automation spa, access Jul. 5, 2019.

*Primary Examiner* — Kevin F Murphy
(74) *Attorney, Agent, or Firm* — Michael J. Feigin, Esq.; Feigin and Fridman LLC (57) ABSTRACT

An air distributor block in pneumatic systems of utility vehicles has at least two modules with a body joined together, at least one mounting hole, at least one through-hole, at least one fastening element and seals placed between the modules is characterized by the fact that it comprises two outer modules: the upper module and the lower module equipped with a central coaxial blind hole with the identical hole in the other modules, and each outer module has at least two mounting through-holes parallel to the central axis of the module, in which bolts are mounted, which protrude above the outer modules, terminated on each side with a threaded tip for connecting to the vehicle frame, where in two opposite side walls of each outer module sockets are made with embedded connector elements or sockets equipped with blinding plugs.

6 Claims, 7 Drawing Sheets

(56) References Cited

U.S. PATENT DOCUMENTS

| | | | | |
|---|---|---|---|---|
| 5,261,704 | A | 11/1993 | Araujo | |
| 5,383,689 | A * | 1/1995 | Wolfe, Sr. | B01D 35/303 285/124.3 |
| 6,832,788 | B2 * | 12/2004 | Fukano | F16L 37/144 285/124.4 |
| 6,929,032 | B2 * | 8/2005 | Rehder | F16K 27/003 137/884 |
| 7,484,770 | B2 * | 2/2009 | Hamada | F16L 41/03 285/124.4 |
| 8,033,297 | B2 * | 10/2011 | Okamoto | F16L 41/03 137/884 |
| 8,246,083 | B2 * | 8/2012 | Ferrali | F16L 37/148 285/305 |
| 8,327,879 | B2 * | 12/2012 | Ellis | F16L 39/06 137/561 A |
| 10,151,406 | B2 * | 12/2018 | Netke | F16L 3/13 |
| 2011/0168285 | A1 | 7/2011 | Seabolt | |

* cited by examiner fig.4a fig.4b fig.5a fig.5b fig.6 fig.7a

B-B fig.7b fig.8a fig.8b

ID BLOCK FOR AIR
DISTRIBUTOR BLOCK FOR AIR DISTRIBUTION IN PNEUMATIC SYSTEMS OF COMMERCIAL VEHICLES

FIELD OF THE DISCLOSED TECHNOLOGY

The subject of the invention is an air distributor block in pneumatic systems of utility vehicles, used in particular for the distribution of compressed air to individual receivers in pneumatic brake systems and suspension system of utility vehicles.

BACKGROUND

Known according to description US2011168285, is a modular hydraulic distributor for distributing fluids to a device, such as a plastic injection moulding machine, and in particular to its coolant fluid line. According to the invention, the modular hydraulic distributor comprises at least two modules. Each module includes a body, openings, at least one fastening hole, at least one through-hole and at least one fastening element in the form of bolts. The body includes a pair of opposite end surfaces, a lower surface and an opposite upper surface and a pair of opposite side surfaces. The opening in each of the opposing end surfaces is hydraulically coupled to define a section of the inner chamber extending through the body. The mounting ports are connected to the section of the inner chamber. The through-hole passes through the body between opposing front surfaces. At least one fastening element may be inserted through at least one through-hole to permanently connect at least two modules in the modular hydraulic distributor.

The previously known air distributors in pneumatic systems of utility vehicles are monoliths made of aluminium alloys, requiring time-consuming machining of a homogeneous block made of aluminium alloys. In known distributors, sockets are made with brass joints successively mounted in them, which results in poor seal and air leaks. Currently used distributors made of metal alloys are subject to corrosion, and they are not resistant to mechanical loads, and require additional protection in the form of protective coatings. Moreover, the disadvantage of existing solutions is weight and complexity of the installation.

In the utility vehicle sector, there are no solutions that improve functionality, reduce weight, increase functionality and configurability, and reduce production costs. So far, modular air distributor blocks in pneumatic systems of utility vehicles have not been used, in particular for the distribution of compressed air into individual receivers in pneumatic brake and suspension systems of utility vehicles.

SUMMARY OF THE INVENTION

The goal of the invention is to provide a solution that can be easily adapted to the needs of a specific customer, quickly connected and set up, which will enable practically any combination desired by a client, and also to provide a distributor, which is characterised by a compact design, low weight, that is non-corrosive, does not require additional protection and saves space necessary for mounting the block in the vehicle.

According to the invention, an air distributor block in pneumatic systems of utility vehicles comprising at least two modules with a body joined together, at least one mounting hole, at least one through-hole, at least one fastening element and seals placed between the modules is characterized by the fact that it comprises two outer modules: the upper module and the lower module equipped with a central coaxial blind hole with the identical hole in the other modules, and each outer module has at least two mounting through-holes parallel to the central axis of the module, in which bolts are mounted, which protrude above the outer modules, terminated on each side with a threaded tip for connecting to the vehicle frame, where in two opposite side walls of each outer module sockets are made with embedded connector elements or sockets equipped with blinding plugs, in the upper wall of the outer lower module and the lower wall of the outer upper module there are two recesses equipped with three through-holes with sockets made along the edge of each side wall, engaging with a locking element equipped with a crossbeam with embedded three vertical lower protruding pins and three vertical upper protruding pins, and the outer module is made of a plastic material containing at least 30% glass fibre.

Favourably, the distributor block additionally comprises at least one inner module embedded between the outer modules equipped with a central through-hole coaxial with the identical hole in the other modules, equipped with at least two mounting through-holes parallel to central axis of the module, in which the bolts are fixed, and in two opposite facing side walls of the inner module there are sockets with embedded connector elements or sockets equipped with blinding plugs, where in the upper and lower wall of each inner module there are two recesses equipped with three through-holes with sockets made along the edges of each side wall, engaging with a locking element equipped with a crossbeam with embedded three vertical lower protruding pins and three vertical upper protruding pins, and the inner module is made of a plastic material containing at least 30% glass fibre.

In the distributor block, the o-ring seal is seated in a groove made on the upper wall of the lower outer module, the lower wall of the upper outer module and the upper wall and lower wall of each inner module.

Permanent connector elements are embedded in the socket: sleeve, locking sleeve and o-ring.

The lower protruding pins of the locking element engage with the sleeve in the lower outer module or the inner module, and the upper protruding pins of the locking element engage with holes in a top-mounted upper outer module or inner module.

Each module is equipped with at least three sockets.

According to the invention the solution is a modular block made of plastic, characterized by a compact construction, small size and weight, which makes it suitable to fully replace the previously used distributor blocks made of metal alloys. The subject distributor block comprises individual modules that can be easily configured as needed. This means that having only a few basic block elements one can build almost any combination desired by the customer. Various combinations are possible, differing in the size and number of sockets for connecting pneumatic conduits. Variants of the distributor block configurations can be build much like toy bricks, which significantly reduces assembly time. This solution also allows self-assembly by the customer. Depending on the needs at the moment, by acquiring several components, the customer can independently assemble any configuration of the distributor block, differing in the number and size of inlets. The compact design of the distributor block saves space necessary for mounting the block in the vehicle. The block body is made of polyamide containing at least 30% of glass fibres. This material is about 60% lighter than previously used light metal alloys. This reduces the weight of the entire vehicle, directly affecting fuel consumption and, as a result, emission into the environment. In addition to being light, the material used does not corrode, it is also sufficiently resistant to mechanical loads. This material does not require additional protection in the form of protective coatings. It is a product that meets the requirements of the automotive standards that define corrosion resistance, such as: PN-EN ISO 9227, ASTM B-1 17-73, ASTM B368.

Another advantage of the solution is the smaller number of connections that could potentially leak. Previous solutions for distributor blocks were constructions made of aluminium alloys with sockets and brass connector successively embedded in them. Each such connection of the connector to the block is a potential source of air leaks. In the solution according to the invention, the number of such connections is at least halved, since the connector socket is made directly in the plastic block. Each element of the pneumatic system is connected directly to the distributor block via a conduit, without the need for additional connectors, adapters, reductions, etc.

DESCRIPTION OF THE INVENTION

The upper outer module 1 shown in FIGS. 1a-1d is provided with a central blind hole 2, coaxial with the identical hole 2 in the other modules, and two mounting through-holes 3 parallel to the central axis of the module 1. In two opposite side walls 4 two sockets 5 are provided with permanently embedded connector elements not shown in the drawing, in the lower wall 6 of the upper outer module 1, two recesses 7 are made along the edge of each side wall 4 with sockets 5 equipped with three square through-holes 8. Module 1 is made of polyamide with the addition of 30% glass fibre.

The lower outer module 9 shown in FIGS. 2a-2d is provided with a central blind hole 2, coaxial with the identical hole in the other modules, and two mounting through-holes 3 parallel to the central axis of the module 9. In two opposite side walls 4, three sockets 5 are provided, two with permanently embedded connector elements not shown in the drawing and one with a plug not shown in the drawing, in the upper wall 10 the lower outer module, two recesses 7 are made along the edge of each side wall 4 with sockets 5 equipped with three square through-holes 8. Module 9 is made of polyamide with the addition of 30% glass fibre.

The inner module 11 shown in FIGS. 3a-3e is provided with a central through-hole 2, coaxial with the identical hole 2 in the other modules, and two mounting through-holes 3 parallel to the central axis. In one side wall 4, two sockets 5 are provided with permanently fixed connector elements not shown in the drawing, in the opposite side wall 4 there are two sockets 5: one with permanently embedded connector elements not shown in the drawing, the second with a plug. In the upper wall 10 and the lower wall 6 of the inner module 11, two recesses 7 with three square through-holes 8, are provided along the edge of each side wall 4 with the sockets 5. Module 11 is made of polyamide with the addition of 30% glass fibre.

Figure 1A:
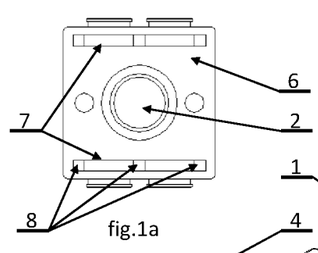
FIG. 1a shows the upper outer module in a bottom view.
Figure 1B:
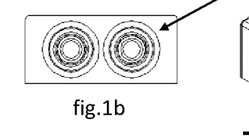
FIG. 1b shows the upper outer module in a side view.
Figure 1C:
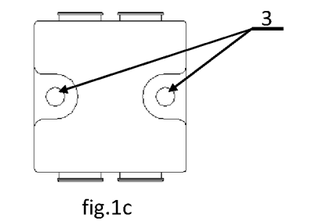
FIG. 1c shows the upper outer module in a top view.
Figure 1D:
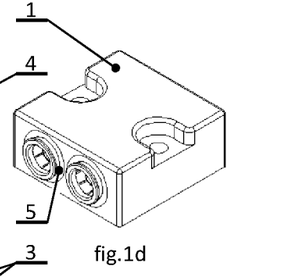
FIG. 1d shows the upper outer module in a perspective view.
Figures 2A, 2B, 2C, 2D:
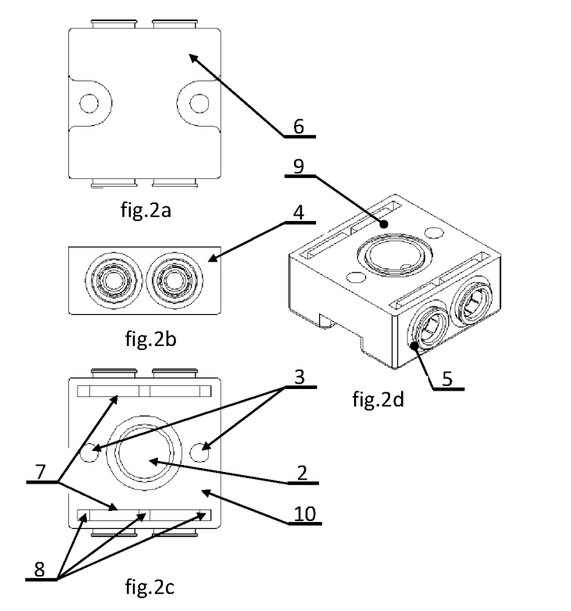
FIG. 2a shows the lower outer module in a bottom view.
FIG. 2b shows the lower outer module in a side view.
FIG. 2c shows the lower outer module in a top view.
FIG. 2d shows the upper outer module in a perspective view.
Figure 3A:
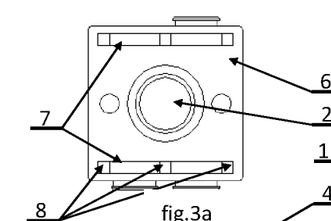
FIG. 3a shows the inner module in a bottom view.
Figure 3B:
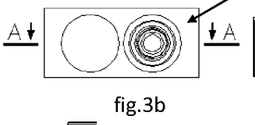
FIG. 3b shows the inner module in a side view.
Figure 3C:
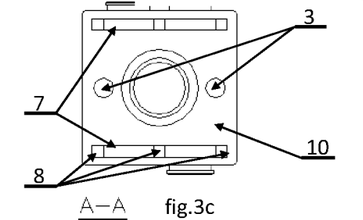
FIG. 3c shows the inner module in a top view.
Figure 3D:
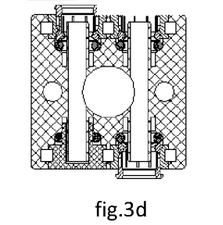
FIG. 3d shows the inner module in A-A section.
Figure 3E:
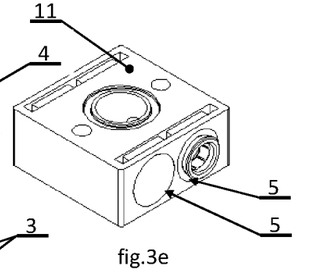
FIG. 3e shows the upper outer module in a perspective view.
Figure 4A:
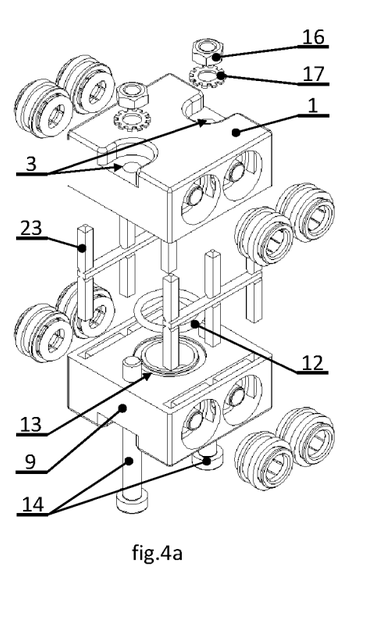
FIG. 4a shows an exploded view of distributor block consisting of an upper outer module and a lower outer module with a bolt.
Figure 5A:
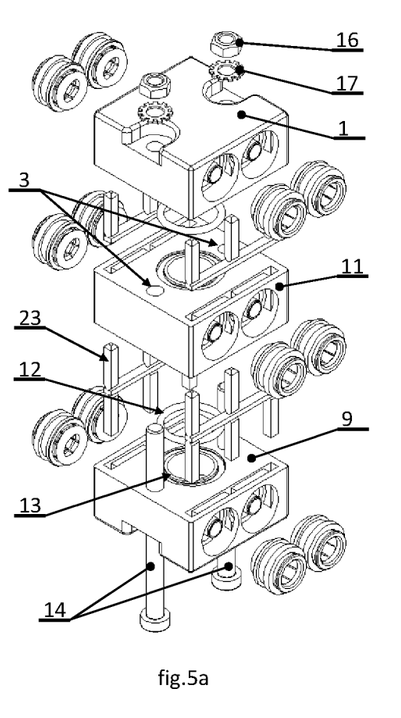
FIG. 5a shows an exploded view of distributor block consisting of an upper outer module, one module and a lower outer module with a bolt.

Tightness of the block between its individual modules 1, 9, 11 is ensured by the O-ring seal 12 shown in FIGS. 4a and 5a, seated in a groove 13 made on the upper wall 10 of the lower outer module 9, the lower wall 6 of the upper outer module 1 and the upper wall 10 and the lower wall 6 of each inner module 11.

Figure 4B:
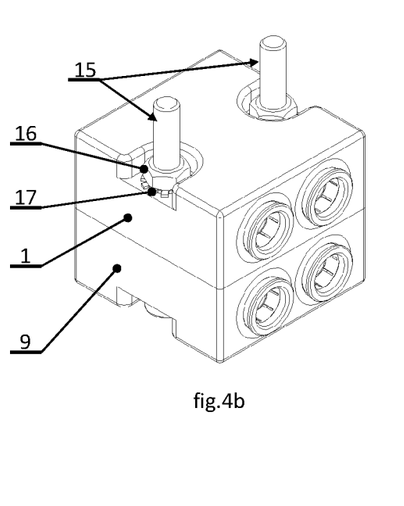
FIG. 4b shows an assembled distributor block comprising an upper outer module and a lower outer module.

In FIGS. 4a and 4b, an exploded and assembled view of the distributor block is shown comprising an upper outer module 1 and a lower outer module 9. Two mounting bolts 14 that fix the modules 1, 9 pass through the two mounting through-holes 3 of each module 1, 9, parallel to the central axis of the modules 1, 9. The bolts 14 protrude above the outer modules 1, 9 and terminate on each side with a threaded tip 15 for connection to the vehicle frame. The block modules 1, 9 are secured by nuts 16 and spring washers 17.

Figure 5B:
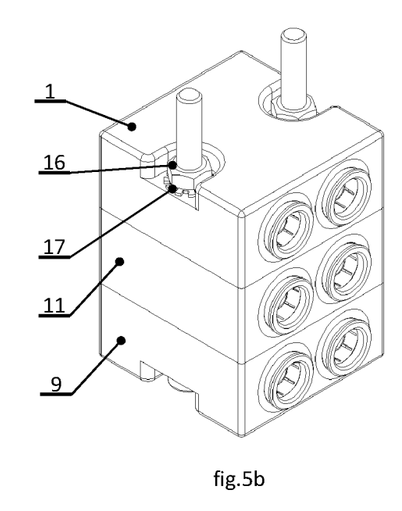
FIG. 5b shows an assembled distributor block comprising an upper outer module, one inner module and a lower outer module.

In FIGS. 5a and 5b, an exploded and assembled view of the distributor block is shown comprising an upper outer module 1, one inner module 11 and a lower outer module 9. Two mounting bolts 14 that fix the modules 1, 9, 11 pass through the two mounting through-holes 3 of each module 1, 9, 11 parallel to the central axis of the modules 1, 9 and 11. The bolts 14 protrude above the outer modules 1, 9 and terminate on each side with a threaded tip 15 for connection to the vehicle frame. The block modules 1, 9 and 11 are secured by nuts 16 and spring washers 17.

Figure 6:
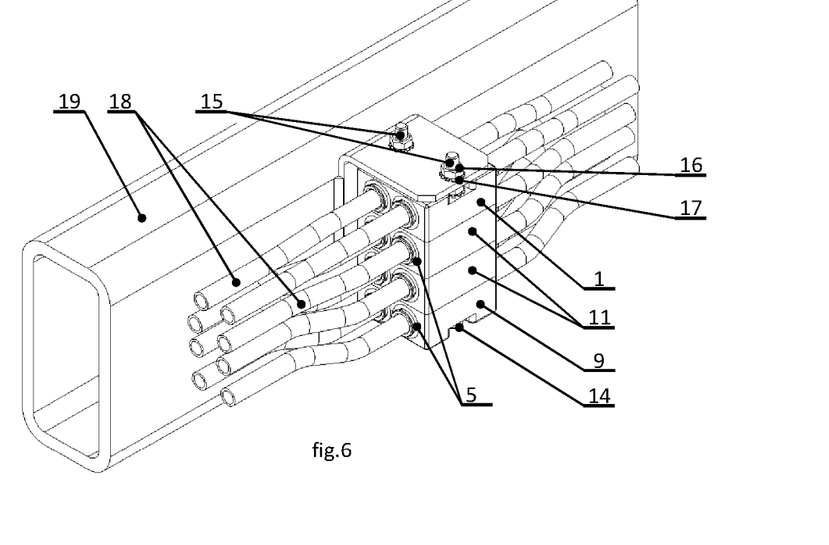
FIG. 6 shows an assembled distributor block comprising an upper outer module, two inner modules and a lower outer module with conduits in the sockets, fixed to the vehicle frame.

In FIG. 6, an assembled view of the distributor block is shown comprising an upper outer module 1, two inner modules 11 and a lower outer module 9. Two mounting bolts 14 that fix the modules 1, 9, 11 pass through the two mounting through-holes 3 of each module 1, 9, 11 parallel to the central axis of the modules 1, 9 and 11. The bolts 14 protrude above the outer modules 1, 9 and terminate on each side with a threaded tip 15. Conduits 18 are fixed in the sockets 5 of modules 1, 9, 11. The block modules 1, 9 and 11 are secured by nuts 16 and spring washers 17. The entire distributor block is attached to the vehicle carrier frame 19 by means of the bolts 14, terminated with a threaded tip 15, onto which the mounting nuts 16 are screwed together with spring washers 17.

Figure 7A:
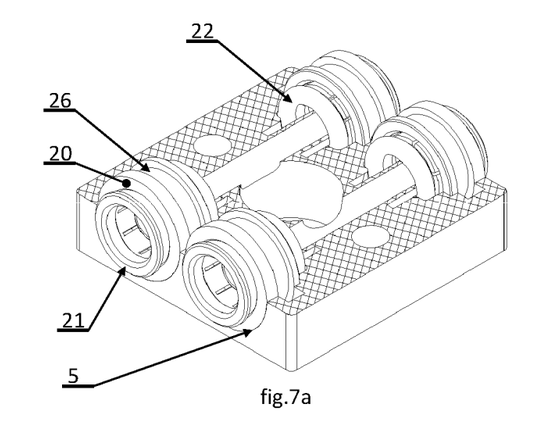
FIG. 7a shows the construction of a socket with connector elements in a perspective partial section.
Figure 7B:
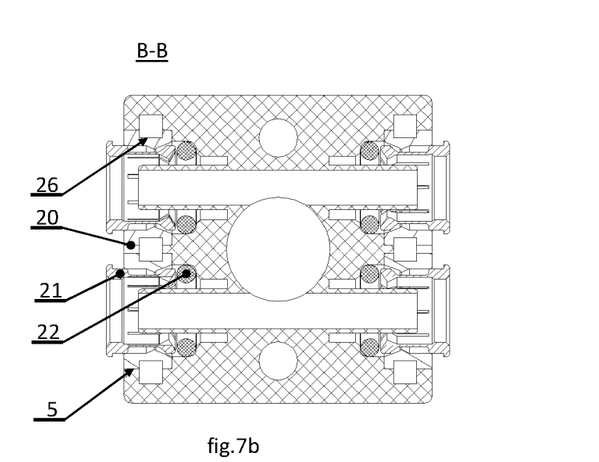
FIG. 7b shows the construction of a socket with connector elements in B-B section.
Figure 8A:
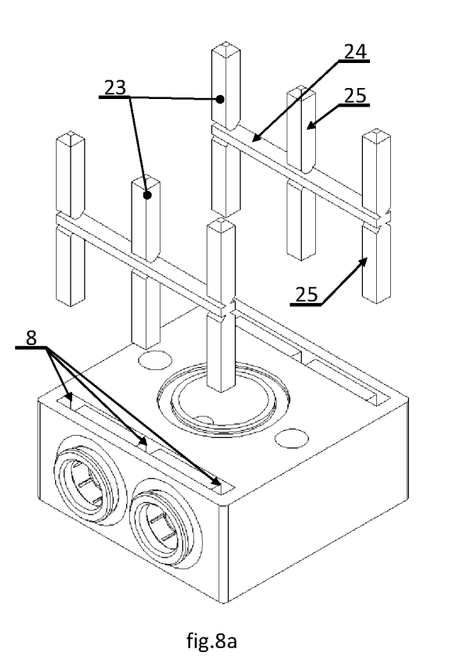
FIG. 8a shows an exploded view of locking element and the inner module.
Figure 8B:
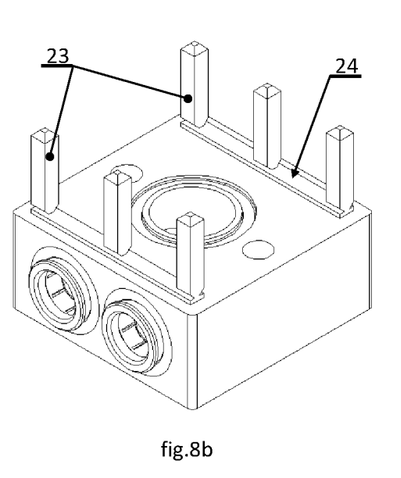
FIG. 8b shows the locking element fixed to the inner module.

The known technical solutions feature sockets, mostly threaded, into which connectors for connecting pneumatic conduits are screwed. As shown in FIGS. 7*a* and 7*b*, the block according to the invention does not have the connectors embedded in the socket 5, which can be independent elements. In each of the block modules 1, 9 and 11, sockets 5 are made in which permanently fixed are the connector elements: sleeve 20, locking sleeve 21, and O-ring 22.

Elements embedded in individual sockets 5 are secured against falling out. The locking sleeve 21, due to its construction—a cone with longitudinal notches that expand when pressed into the sleeve 20, after being embedded in the sleeve 20, is automatically secured against falling out. The O-ring 21 is clamped in socket 5 by means of the sleeve 20. The sleeve 20 is prevented from falling out of the socket 5 by means of the locking element 23 shown in FIGS. 4*a*, 5*a*, 8*a* and 8*b*, provided with a crossbeam 24 with embedded three vertical lower protruding pins 25 and three vertical upper protruding pins 25. The lower protruding pins 25 of the locking element 23 engage with the sleeve 20 shown in FIG. 7*b* in the lower outer module 9 or the inner module 11, and the upper protruding pins 25 of the locking element 23 engage with holes 8 in a top-mounted upper outer module 1 or inner module 11. As shown in FIGS. 7*a* and 7*b*, the sleeve 20 features a special circumferential groove 26. After seating the sleeve 20 in the sockets 5, the protruding pins 25 of the locking element 23 are pressed into the square holes 8. The protruding pins 25 engage with the grooves 26 in the sleeve 20, securely preventing the sleeve 20 from falling out of the socket 5.

The invention claimed is:

1. An air distributor block for pneumatic systems of utility vehicles comprising:
    a plurality of modules, each module thereof comprising:
        a body joined together with at least one other module of said plurality of modules,
    at least one seal placed between at least two of the plurality of the modules:
    a top module and a bottom module of said plurality of modules each equipped with a central coaxial blind hole, the blind holes of the respective modules having identical diameters;
    wherein the top module and the bottom module each have at least two mounting through-holes parallel to a central axis thereof in which bolts are mounted which protrude above the top module, the bolts each terminated with a threaded end adapted for connecting said air distributor block to a vehicle frame;
    and wherein the top module and the bottom module each comprise sockets formed with embedded connectors or blinding plugs;
    at least one locking element equipped with a crossbeam and an embedded three vertical bottom projecting pins and three vertical top projecting pins;
    in each of a respective upper wall of the bottom module and a lower wall of the top module two recesses are each equipped with three through holes, each of the through holes receiving one of said projecting pins of one of said at least one locking element;
    each of said embedded connectors engaging with said at least one locking element;
    and wherein the top module or the bottom module is made of a plastic material containing at least 30% glass fiber.

2. The air distributor block of claim 1, wherein the air distributor block additionally comprises:
    at least one internal module of said plurality of modules embedded between the top module and the bottom modules by way of being equipped with a central through hole coaxial with the central blind hole in the other modules and with at least two mounting through holes parallel to a central axis of the module, in which the bolts are fixed, and in two opposite facing side walls of the internal module there are sockets with embedded connecting elements or blinding plugs, where in an upper and lower wall of each internal module there are two recesses equipped with three through holes, the sockets provided in said two opposite facing side walls, engaging with the at least one locking element equipped with a crossbeam with the embedded three vertical bottom projecting pins and three vertical top projecting pins, and the at least one internal module is made of a plastic material containing at least 30% glass fiber.

3. The system air distributor block of claim 2, wherein the at least one seal comprises an O-ring seal seated in a groove made on the upper wall of the bottom module, the bottom wall of the top module and the upper wall and bottom wall of each of said at least one internal modules between said top module and said bottom module.

4. The air distributor block of claim 3, wherein the air distributor block further comprises an additional socket permanently embedded with the following connection elements: a sleeve-, a locking sleeve, and/or an o-ring.

5. The air distributor block of claim 4, wherein the air distributor block comprises the bottom projecting pins of the at least one locking element which engage with the sleeve in the bottom module or the internal module; and
    the top projecting pins of the at least one locking element engage with the through holes in the top module or the internal module.

6. The air distributor block of claim 5, wherein the air distributor block is equipped with at least three sockets in at least one of the plurality of modules.

* * * * *